United States Patent
Chen (10) Patent No.: US 11,449,702 B2
(45) Date of Patent: Sep. 20, 2022

(54) SYSTEMS AND METHODS FOR SEARCHING IMAGES

(71) Applicant: ZHEJIANG DAHUA TECHNOLOGY CO., LTD., Zhejiang (CN)

(72) Inventor: Yufei Chen, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 330 days.

(21) Appl. No.: 16/749,974

(22) Filed: Jan. 22, 2020

(65) Prior Publication Data
US 2020/0160099 A1     May 21, 2020

Related U.S. Application Data

(63) Continuation of application No. PCT/CN2018/091923, filed on Jun. 20, 2018.

(30) Foreign Application Priority Data

Aug. 8, 2017    (CN) .......................... 201710671798.6

(51) Int. Cl.
    *G06K 9/62*      (2022.01)
    *G06F 16/532*    (2019.01)
      (Continued)

(52) U.S. Cl.
    CPC ......... *G06K 9/6215* (2013.01); *G06F 16/532* (2019.01); *G06K 9/6256* (2013.01);
      (Continued)

(58) Field of Classification Search
    CPC .. G06K 9/6215; G06K 9/6256; G06K 9/6274; G06F 16/532; G06F 16/53;
      (Continued)

(56) References Cited

U.S. PATENT DOCUMENTS 9,418,319 B2    8/2016   Shen et al.
9,436,895 B1 *   9/2016   Jones ..................... G06V 10/82
            (Continued)

FOREIGN PATENT DOCUMENTS

CN     102999752 A    3/2013
CN     104679863 A    6/2015
       (Continued)

OTHER PUBLICATIONS

Bertinetto, L., et al., "Fully-Convolutional Siamese Networks for Object Tracking", in ECCV 2016 Workshops, Part II, LNCS 9914, pp. 850-865, 2016.*

(Continued)

*Primary Examiner* — Xuemei G Chen
(74) *Attorney, Agent, or Firm* — Metis IP LLC (57) ABSTRACT

The present disclosure relates to a system, method and non-transitory computer readable medium for reverse image searching. The system includes a storage device storing a set of instructions; and one or more processors in communication with the storage device. When executing the set of instructions, the one or more processors: obtain a target part of reference image features of a reference image; obtain a target part of target image features of a target image; determine, based on the target part of the reference image features and the target part of the target image features, whether the target image is similar to the reference image; and mark, upon a determination that the target image is similar to the reference image, the target image as a similar image of the reference image.

20 Claims, 6 Drawing Sheets

(51) Int. Cl.
*G06N 3/04* (2006.01)
*G06N 3/08* (2006.01)
*G06V 10/50* (2022.01)

(52) U.S. Cl.
CPC .............. *G06N 3/04* (2013.01); *G06N 3/08* (2013.01); *G06V 10/50* (2022.01)

(58) Field of Classification Search
CPC ........ G06F 16/5854; G06N 3/04; G06N 3/08; G06V 10/50; G06V 10/454; G06V 10/82
See application file for complete search history.

(56) References Cited

U.S. PATENT DOCUMENTS

| | | | |
|---|---|---|---|
| 10,042,935 B1* | 8/2018 | Perkins | G06F 16/50 |
| 10,740,385 B1* | 8/2020 | Hohwald | G06F 16/55 |
| 2007/0260634 A1 | 11/2007 | Makela et al. | |
| 2008/0292189 A1* | 11/2008 | Morimoto | G06V 10/757 382/181 |
| 2010/0299355 A1 | 11/2010 | Shiiyama et al. | |
| 2017/0076152 A1* | 3/2017 | Asl | G06N 3/0454 |
| 2017/0091952 A1* | 3/2017 | Sun | G06V 10/462 |
| 2017/0098138 A1* | 4/2017 | Wang | G06V 30/245 |
| 2017/0124711 A1* | 5/2017 | Chandraker | G06V 20/64 |
| 2017/0161590 A1* | 6/2017 | Boulkenafed | G06V 10/82 |
| 2017/0249339 A1* | 8/2017 | Lester | G06F 16/56 |
| 2018/0075597 A1* | 3/2018 | Zhou | G06N 20/00 |
| 2018/0129934 A1* | 5/2018 | Tao | G06V 10/82 |
| 2018/0330509 A1* | 11/2018 | Watanabe | B60W 30/09 |
| 2018/0349477 A1* | 12/2018 | Jaech | G06F 16/902 |
| 2019/0019058 A1* | 1/2019 | Woodbridge | G06N 3/0454 |
| 2019/0034793 A1* | 1/2019 | Kataria | G06F 16/93 |
| 2019/0066313 A1* | 2/2019 | Kim | G06V 10/40 |
| 2020/0074185 A1* | 3/2020 | Rhodes | G06F 17/18 |
| 2020/0133182 A1* | 4/2020 | Haik | H04N 1/40068 |
| 2020/0218904 A1* | 7/2020 | Olmeda Reino | G06V 20/58 |

FOREIGN PATENT DOCUMENTS

| | | |
|---|---|---|
| CN | 105303150 A | 2/2016 |
| CN | 105354228 A | 2/2016 |

OTHER PUBLICATIONS

Luca Bertinetto et al., Fully-Convolutional Siamese Networks for Object Tracking, International Conference on Financial Cryptography and data security, 2016, 16 pages.

Kaisang Leung et al., Multiresolution Subimage Similarity Matching for Large Image Databases, SPIE-International Society for Optical Engineering, 3312: 1997, 12 pages.

Extended European Search Report in European Application No. 18845092.8 dated Jun. 8, 2020, 8 pages.

International Search Report in PCT/CN2018/091923 dated Sep. 27, 2018, 4 pages.

Written Opinion in PCT/CN2018/091923 dated Sep. 27, 2018, 4 pages.

Qu Bingxin, Research on Deep Learning based Image Classification, Full Text Database of China Excellent Master Thesis Information Technology, 2017, 91 pages.

Gregory Koch et al., Siamese Neural Networks for One-Shot Image Recognition, ICML Deep Learning Workshop, 2015, 8 pages.

Communication Pursuant to Article 94(3) EPC in European Application No. 18845092.8 dated Mar. 22, 2022, 6 pages.

Nicu Sebe et al., Multi-Scale Sub-Image Search, Proceedings of the Seventh ACM International Conference on Multimedia, 79-82, 1999.

* cited by examiner

Target Block 1

Target
Block 2

SYSTEMS AND METHODS FOR SEARCHING IMAGES

CROSS-REFERENCE TO RELATED APPLICATIONS

The present disclosure is a Continuation of International Application No. PCT/CN2018/091923 filed on Jun. 20, 2018, which claims priority of Chinese Application No. 201710671798.6 filed on Aug. 8, 2017. The entire contents of above applications are hereby incorporated by reference in their entireties.

TECHNICAL FIELD

The present disclosure generally relates to imaging processing, and in particular, to systems and methods for searching similar images.

BACKGROUND

As data of images in the Internet gets greater, requirements for image search are increasing. Methods for image search have also emerged.

Reverse image search is a technique for searching similar images by inputting a query image. It mainly involves two major parts of image feature extraction and image feature similarity analysis. In a traditional technique of reverse image search, the whole image features of a query image are extracted using typical convolutional neural network (CNN), and then are compared with the whole image features of a candidate image in an image database. The candidate image satisfied a similarity requirement is designated as the result of reverse image search. However, the extracting of the whole image features is complicated. Additionally, differences between images of cars are too small that a similarity comparison of the whole image features causes a great error.

In summary, search results obtained by techniques of reverse image search in prior arts are inaccurate.

SUMMARY

According to an aspect of the present disclosure, a system for reverse image searching may include a storage device storing a set of instructions; and one or more processors in communication with the storage device. When executing the set of instructions, the one or more processors may obtain a target part of reference image features of a reference image; obtain a target part of target image features of a target image, wherein the target part of the target image features are selected from the target image features based on the target part of the reference image features; determine, based on the target part of the reference image features and the target part of the target image features, whether the target image is similar to the reference image; and mark, upon a determination that the target image is similar to the reference image, the target image as a similar image of the reference image.

In some embodiments, to obtain the target part of the reference image features of the reference image, the one or more processors may obtain a target region of the reference image; and obtain the target part of the reference image features corresponding to the target region of the reference image.

In some embodiments, to determine, based on the target part of the reference image features and the target part of the target image features, whether the target image is similar to the reference image, the one or more processors may determine a similarity between the target part of the reference image features and the target part of the target image features; determine whether the similarity is greater than a first threshold; and upon a determination that the similarity is greater than the first threshold, determine that the target image is similar to the reference image.

In some embodiments, to obtain the target part of the target image features of the target image, the one or more processors may generate a score map based on the target part of the reference image features and the target image features, wherein the score map includes a plurality of points, each point corresponding to a score; determine a target block of the score map based on a plurality of scores, wherein the target block is associated with the target region of the reference image; identify a target region of the target image based on the target block of the score map; and obtain the target part of the target image features corresponding to the target region of the target image.

In some embodiments, to generate the score map, the one or more processors may conduct a convolution calculation to the target part of the reference image features and the target image features.

In some embodiments, to determine the target block of the score map, the one or more processors may obtain one or more blocks of the score map, each block corresponding to the target region of the reference image; for each of the one or more blocks, determine a summation of the scores corresponding to the points in the block; and designate the target block with a maximum summation of the scores.

In some embodiments, the one or more processors may further determine whether the maximum summation of the scores is greater than a second threshold; and upon a determination that the maximum summation of the scores is greater than the second threshold, designate the target block with the maximum summation of the scores.

In some embodiments, a size of the score map may be the same as a size of the target image, each point of the score map corresponding to one or more pixels of the target image; and a size of the target block may be the same as a size of the target region of the reference image, each point of the target block corresponding to one or more pixels of the reference image.

In some embodiments, the target part of the reference image features corresponding to the target region of the reference image and the target image features of the target image may be obtained based on a fully convolutional siamese neural network model.

In some embodiments, the fully convolutional siamese neural network model may be generated based on a training process. The training process may include obtaining a plurality of sample images, each relating to a same object; obtaining a preliminary fully convolutional siamese neural network; for each sample image, obtaining a region of the sample image as a first input of the preliminary siamese neural network, and obtaining the sample image as a second input of the preliminary siamese neural network; and training the preliminary fully convolutional siamese neural network based on a plurality of first inputs and a plurality of second inputs.

In some embodiments, the training process may further include, for each sample image, generating first sample image features based on the first input, generating second sample image features based on the second input, and generating a sample score map based on the first sample image features and the second sample image features; and training the preliminary siamese neural network based on a plurality of sample score maps.

According to an aspect of the present disclosure, a method may be implemented on a reverse image search device having at least one processor, at least one computer-readable storage medium, and a communication platform connected to a network. The method may include obtaining a target part of reference image features of a reference image; obtaining a target part of target image features of a target image, wherein the target part of the target image features are selected from the target image features based on the target part of the reference image features; determining, based on the target part of the reference image features and the target part of the target image features, whether the target image is similar to the reference image; and marking, upon a determination that the target image is similar to the reference image, the target image as a similar image of the reference image.

According to an aspect of the present disclosure, a non-transitory computer readable medium may include instructions configured to cause a computing system to obtain a target part of reference image features of a reference image; obtain a target part of target image features of a target image, wherein the target part of the target image features are selected from the target image features based on the target part of the reference image features; determine, based on the target part of the reference image features and the target part of the target image features, whether the target image is similar to the reference image; and mark, upon a determination that the target image is similar to the reference image, the target image as a similar image of the reference image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Greater errors may exist in the results of reverse image search techniques illustrated in prior arts. To solve the problem, a method of reverse image search is provided according to some embodiments of the present disclosure. According to a fully convolutional siamese neural network model, the method may use a local region image of a first image (i.e., a reference image) as a query input, and search through thousands and millions of candidate images to determine a second image (i.e., a target image) similar to the first image from a preset database. The method may determine a target block associated with the local region image from a score map, then determine the image features corresponding to the target block of the second image as the most similar part to the image features of the local region image of the first image. Further, the method may determine whether the similarity between the image features corresponding to the target block of the second image and those of the local region image satisfies a set condition. Based on the determination, the method may determine whether the second image is similar to the first image. Thus, the result of reverse image search may be more accurate.

In the present disclosure, the image features of the first image (or the reference image) may be marked as the first image features (or reference image features). The image features of the second image (or the target image) may be marked as the second image features (or target image features). The local region image of the first image may also be referred to as the target region of the first image. The image features corresponding to the target block of the second image may also be referred to as the target part of the second image features. The image features of the local region image of the first image may also be referred to as the target part of the first image features.

For the purposes of understanding the embodiments of the present disclosure, firstly, a fully convolutional siamese neural network model may be illustrated.

The fully convolutional siamese neural network model may include a first network branch and a second network branch. Each network branch may include an input layer, at least one convolution layer, and at least one pooling layer. A convolution layer may preform convolution processing. A pooling layer may perform pooling processing.

In some embodiments, the number and/or distribution of the convolution layers and/or pooling layers included in the first network branch and the second network branch may be the same. In some embodiments, parameters relating to the convolution processing of the first network branch and the second network branch may be the same, and parameters relating to the pooling processing of the first network branch and the second network branch may also be the same. It should be understood that the configuration of the parameters illustrated above is merely examples and not intended to be limiting. In some embodiments, the parameters may be determined based on a specific need. For example, the parameters relating to the convolution processing and/or the pooling processing of the first network branch and the second network branch may be different.

To facilitate illustrating the fully convolutional siamese neural network model, an example may be provided as follows. The example may be executed by the reverse image search device 400 shown in FIG. 4.

A first image may be input to the input layer of the first network branch. Then, the first network branch may output the first image features after the convolution processing of at least one convolution layer and the pooling processing of at least one pooling layer. A second image may be input to the input layer of the second network branch. Then, the second network branch may output the second image features after the convolution processing of at least one convolution layer and the pooling processing of at least one pooling layer. A convolution calculation to the first image features and the second image features may be conducted, thus obtaining a convolution result. The convolution result may serve as a score map.

In some embodiments, one or more bias parameters may be added in the convolution calculation. In some embodiments, the convolution calculation may be conducted according to Equation 1.

$$f(A,B)=\alpha(A)*\alpha(B)+b \quad \text{Equation 1,}$$

wherein, A and B refer to the first image and the second image, respectively; α(A) and α(B) refer to the first image features and the second image features, respectively; and b refers to a bias parameter, wherein b may be a real number.

In addition, it should be understood that, the terms "first", "second", etc. in the present disclosure, are only for the purposes of illustration, and not intended to denote or indicate importance and orders.

In the following, several embodiments of the present disclosure may be further described in detail with reference to the drawings.

Figure 1:
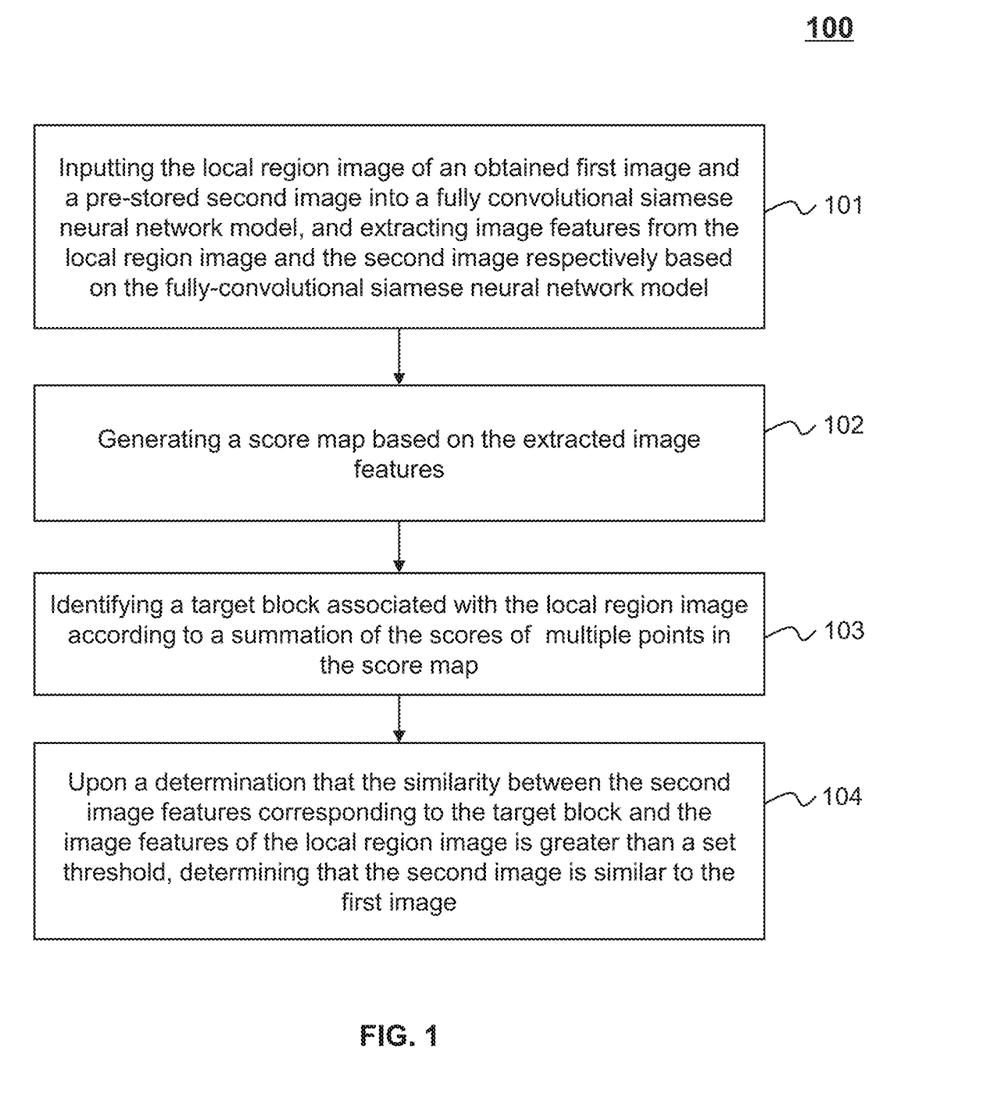
FIG. 1 is a flowchart illustrating an exemplary process of reverse image search according to some embodiments of the present disclosure.

FIG. 1 is a flowchart illustrating an exemplary process 100 of reverse image search according to some embodiments of the present disclosure.

Here, the reverse image search may refer to a technology that using a reference image as a search query to find from an image database similar images.

In some embodiments, process 100 may be implemented in one or more circumstances including, for example, a user query in the Internet. A user may input a query image using a user terminal (e.g., a computer, a mobile phone). A search server may receive the query image and determine one or more images similar to the query image from an image database. Then, the search server may provide the one or more images to the user through the user terminal.

Figure 4:
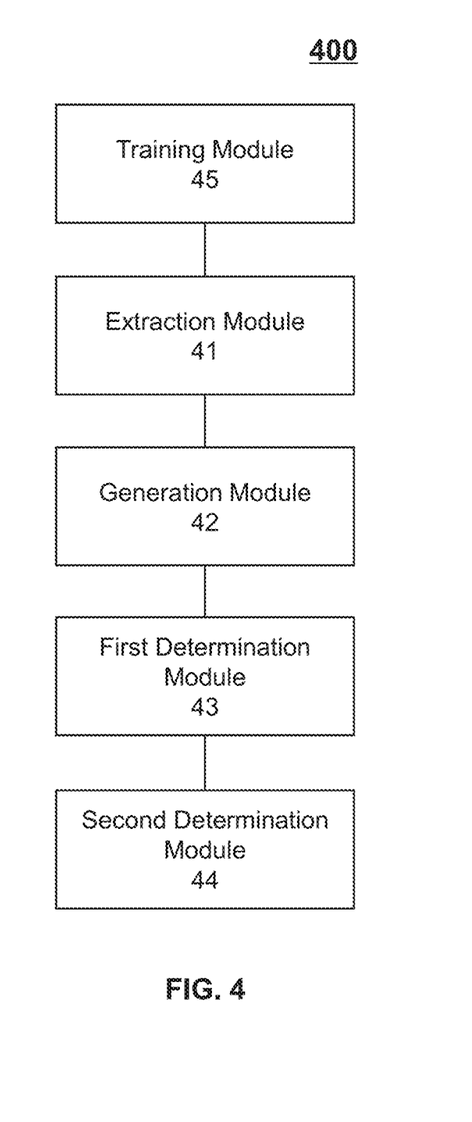
FIG. 4 is a schematic diagram illustrating an exemplary device of reverse image search according to some embodiments of the present disclosure.

In some embodiments, process 100 may be executed by a reverse image search device 400 shown in FIG. 4. The reverse image search device 400 may be implemented on a search sever.

According to example embodiments of the present disclosure, the search server may be a server computer. The server may have connection and/or communication to a query system via one or more information exchanging ports. The query system may include one or more networks, a number of individual user terminals, and the one or more information exchanging ports. Each individual user terminal may be an electronic device capable of sending queries for image searching. For example, the user terminals may be computer terminals or smart phones. Each user terminals may respectively connect to the one or more networks, wherein the one or more networks may be Internet, WAN, LAN, mobile network etc. The one or more information exchanging ports may be interfaces that the server connects to the one or more networks. For example, the one or more information exchanging ports may be one or more network (e.g., the Internet) interfaces and/or ports that connect the server with the one or more networks. Further, as shown in FIG. 4, the search server may include an extraction module 41, an generation module 42, a first determination module 43, a second determination module 44, and a training module 45. Detailed introduction of the above modules may be disclosed elsewhere in the present disclosure.

In 101, the extraction module 41 may input the local region image of an obtained first image (e.g., a reference image) and a pre-stored second image (e.g., a target image to compare similarity with the reference image) into a fully convolutional siamese neural network model, and extract image features from the local region image and the second image respectively based on the fully-convolutional siamese neural network model.

In some embodiments, the extraction module 41 (e.g., the search server) may obtain the first image. The first image may be input by a user using a user terminal, such as a user terminal of the query system. The first image may serve as a reference image for the server to search similar images. The extraction module 41 may instruct the user terminal to display the first image in the display interface and to indicate the user to select a specific region. After receiving the specific region fed back by the user terminal, the extraction module 41 may determine the local region image of the first image based on the specific region. The local region image of the first image may include at least part of the specific region. The local region image of the first image may be used as the search condition.

In some embodiments, the specific region may be located in the center of the local region image. Alternatively, the specific region may be located by and/or near the edge of the first image. In some embodiments, the local region image may include the whole of the specific region. For example, the local region image may be the same as the specific region. Merely by way of example, when the first image is 256*256, a 48*48 local region image including the specific region may be determined in the first image as the search condition (e.g., a search query).

It should be noted that, in some embodiments, the specific region may not be selected by the user. For example, the specific region may be determined semi-automatically by, for example, the extraction module 41 and a user. Merely by way of example, the extraction module 41 may divide the first image into several parts. Each part may represent a category including, for example, people, animal, environment, word. The extraction module 41 may select the specific region based on categories and a user instruction. Alternatively, the specific region may be determined automatically by, for example, the extraction module 41.

It should be noted that, in some embodiments, the first image may be enlarged or narrowed to a specific size. Then, the local region image may be selected from the enlarged or narrowed first image.

In some embodiments, the local region image of the first image may be used as the first input image of the first network branch in the fully convolutional siamese neural network model. The pre-stored second image may be used as the second input image of the second network branch in the fully convolutional siamese neural network model. Alternatively, the local region image may be used as the second input image of the second network branch, and the pre-stored second image may be used as the first input image of the first network branch. The second image may be pre-stored in a preset database (e.g., an image database) or a cloud database. In addition, in some embodiments, the pre-stored second image may not be input to the fully convolutional siamese neural network model. The second image features of the second image may be extracted in advance and pre-stored in a database. After determining the local region image of the first image and extracting the image features thereof, the first determination module 43 (e.g., the search sever) may compare the image features of the local region image with the pre-stored second image features of the second images directly.

In some embodiments, to extract the image features from the local region image and the second image respectively based on the fully-convolutional siamese neural network model, the extraction module 41 may perform one or more operations illustrated below.

Based on the fully convolutional siamese neural network model, the extraction module 41 may execute at least one convolution processing and at least one pooling processing on the local region image, thus obtaining the image features of the local region image. The extraction module 41 may also execute at least one convolution processing and at least one pooling processing on the second image, thus obtaining the second image features of the second image. As illustrated elsewhere, the at least one convolution processing and at least one pooling processing on the second image may be performed in advance and the second image features of the second image may be pre-stored in a database.

The output image features (e.g., the image features of the local region image, the second image features of the second image) after convolution processing and pooling processing may be one or more feature maps with the same size. Moreover, parameters in the convolution processing and the pooling processing, for example, the sizes and number of convolution kernels used for each convolution layer or each pooling layer may be preconfigured via the training process of the fully convolutional siamese neural network model.

It should be noted that, the input and output of each convolutional layer and each pooling layer in the fully convolutional siamese neural network model may include one or more feature maps. For each convolution layer, the number of feature maps of the output may relate to the number of feature maps of the input and the number of color channels in the convolution layer. The number of color channels in the convolution layer may relate to the number of convolution kernels used in the convolution layer. For example, for a 256*256 color image, if there are three-color channels in the convolution layer, three images respectively including red elements, green elements, and blue elements may be obtained after the image processing in the convolution layer. Assuming that 16 convolution kernels of 3*3 in the convolution layer may be used to execute the convolution processing on the image in each color channel, 16 feature maps may be obtained. Then there may be 16*3 feature maps in the three-color channels. Combine the 16*3 feature maps generated in the three-color channels and finally obtain 16 feature maps.

In 102, the generation module 42 may generate a score map based on the extracted image features. The score map may include a plurality of points. Each point in the score map may correspond to a score.

In some embodiments, each point in the score map may correspond to one or more pixels in the second image. Accordingly, each point in the score map may correspond to the second image features of the one or more corresponding pixels in the second image. Each pixel may include a specific size.

In some embodiments, the score map may include one or more blocks. Each block may include multiple points. Each block may correspond to the local region image of the first image, which means that the size of the block is the same as the local region image or a processed local region image. The processed local region image may include an enlarged or narrowed local image.

In some embodiments, the generation module 42 may generate the score map by a convolution calculation to the image features of the local region image and the second image features of the second image. The result of the convolution calculation may serve as the score map. During the convolution calculation, the local region image may sweep the score map. The sweeping region of the score map may refer to the block.

In 103, the first determination module 43 may identify a target block associated with the local region image according to a summation of the scores of multiple points in the score map.

In some embodiments, the first determination module 43 may divide the score map into at least one block including a specific number of points. For each of the at least one block, the first determination module 43 may determine the summation of the scores of the specific number of points. The first determination module 43 may designate the block with the maximum summation of the scores as the target block associated with the local region image. The location of the target block may refer to the most likely location where the local region image may map to the score map. In other words, the region corresponding to the target block of the second image, also referred to as the target region of the second image, may be the most similar to the local region image. Consequently, the second image features corresponding to the target block may be the most similar to the image features of the local region image.

In some embodiments, in order to accurately and quickly determine whether the second image is similar to the first image, during the designation of the target block associated with the local region image, the first determination module 43 may set one or more conditions. For example, after determining the summation of the scores for each of the at least one block, the first determination module 43 may determine whether the maximum summation of the scores is greater than a set threshold. Upon the determination that the maximum summation of the scores is greater than the set threshold, the first determination module 43 may determine the block with the maximum summation as the target block. Alternatively, upon the determination that the maximum summation of the scores is not greater than the set threshold, the first determination module 43 may determine that there is no target block associated with the local region image in the score map. Furthermore, upon the determination that there is no target block associated with the local region image in the score map, the first determination module 43 may determine that the second image is not similar to the first image. Process 100 may end without executing extra operations (e.g., operation 104).

In 104, upon a determination that the similarity between the second image features corresponding to the target block and the image features of the local region image is greater than a set threshold, the second determination module 44 may determine that the second image is similar to the first image.

In some embodiments, the similarity between the second image features corresponding to the target block and the image features of the local region image may be analyzed based on the cosine similarity algorithm. The cosine similarity algorithm may refer prior arts and not be described in detail here. In some embodiments, the similarity may be analyzed based on other similarity algorithms, which is not limited in the present disclosure.

In some embodiments, when determining a similar image to the first image, the second determination module 44 may compare at least one second image with the first image. For each of the at least one second image, the second determination module 44 may compare the pre-stored image features of the second image with the image features of the local region image. Then, the second determination module 44 may obtain at least one similarity between the second image features corresponding to the target block and the image features of the local region image. Upon the determination that the at least one similarity is greater than the set threshold, the second determination module 44 may rank the at least one second image in a descending order according to the at least one similarity. Further, the second determination module 44 may determine one or more top second images as the result of reverse image search. In some embodiments, when determining a similar image to the first image, the second determination module 44 may set one or more extra conditions based on a specific need. For example, the second determination module 44 may set an extra condition in which the similar image is published before 2014. Other extra conditions may not be described in detail here.

In some embodiments, process 100 may further include one or more operations. For example, a determination module (for example, the first determination module 43, the second determination module 44) may determine whether there is a historical search record relating to the first image. Merely by way of example, the determination module may determine whether there is a historical search record in which the search condition (e.g., a search query) is the same as the first image. Upon the determination that there is a historical search record in which the search condition is the same as the first image, the determination module may retrieve the search result of the historical search. Upon the determination that there is not a historical search record in which the search condition is the same as the first image, process 100 may proceed to operation 101.

In addition, process 100 may be applicable when the location of a local region image shifts in the first image. For example, assume that the car in the first image is the same as that in the pre-stored second image, but the location of the tissue box in the first image is different from that in the second image.

In prior arts, the first image features of the first image and the second image features of the second image may be compared one by one, based on the relative locations thereof. In other words, the first image features of the first image may be compared with the second image features in the same relative region of the second image. Since the location of the tissue box shifts in the first image and the second image, the comparison result may be that the second image is not similar to the first image, thus resulting in misjudgment.

In the present disclosure, the target block associated with the local region image may be determined in the score map. The target block may be an optional region in the score map. Correspondingly, the region corresponding to the target block of the second image (i.e., the target region of the second image) may be optional. The second image features of the target region of the second image may be optional. The second image features of the target region of the second image may be designated the most similar part to the image features of the local region image. Further, whether the second image is similar to the first image may be determined based on the similarity between the second image features of the target region of the second image and the image features of the local region image. Therefore, the similarity comparison between image features of the same relative regions of the first image and the second image is weakened in the present disclosure. The target block is determined firstly. Then, the similarity between the second image features corresponding to the target block and the image features of the local region image is compared. Since the second image features corresponding to the target block is not limited by the relative location of the local region image, the result of the reverse image search becomes more accurate.

Moreover, the fully convolutional siamese neural network model needs to be trained before being used. The model training may be performed by the training module 45. A specific process of model training may be illustrated below.

The training module 45 may obtain a training sample set including a plurality of sample images, each relating to the same object. For each sample image, the training module 45 may obtain a local region image of the sample image as a first input and obtain the sample image as a second input. The training module 45 may train a preliminary fully convolutional siamese neural network model based on a plurality of first inputs and second inputs. The plurality of first inputs and second inputs may be acquired randomly from the training sample set. Upon a determination that the score map output by the trained fully convolutional siamese neural network model satisfies a preset condition, the training module 45 may determine that the training process is completed. As used herein, the first input may be used as the first input image of the first network branch, and the second input may be used as the second input image of the second network branch.

Specifically, the training module 45 may extract the image features of the first input image and the second input image respectively using the current configuration parameters. The training module 45 may generate a score map based on the extracted image features. Here, the configuration parameters may include parameters needed in the fully convolutional siamese neural network, for example, parameters needed in the convolution processing, the pooling processing, and the generation of the score map.

Further, for each point in the score map, the training module 45 may determine the loss value between the current score value and the expected score. Here, the loss value may be understood as the error between an output score of the full convolutional neural network and a manually labeled score. The expected score may be preset by, for example, an operator. In some embodiments, for each point in the score map, the determination of the loss value may be performed according to Equation 2.

$$l(y,v)=\log(1+\exp(-yv)) \quad \text{Equation 2,}$$

wherein, y refers to the expected score of each point in a preset manually labeled score map, $y \in \{+1,-1\}$; v refers to the score of each point in an output score map of the fully convolutional siamese neural network model, $v \in R$. In the model training process, the value of v will gradually tend to be +1 or −1.

In some embodiments, when the score of a point in the score map is +1, the second image features corresponding to the point may correspond to the image features of the first input image. In other words, the second image features corresponding to the point may be the most similar to the image features of the first input image. Alternatively, when the score of a point in the score map is −1, the second image features corresponding to the point may not correspond to the image features of the first input image. In other words, the second image features corresponding to the point may not be the most similar to the image features of the first input image.

Figure 2A:
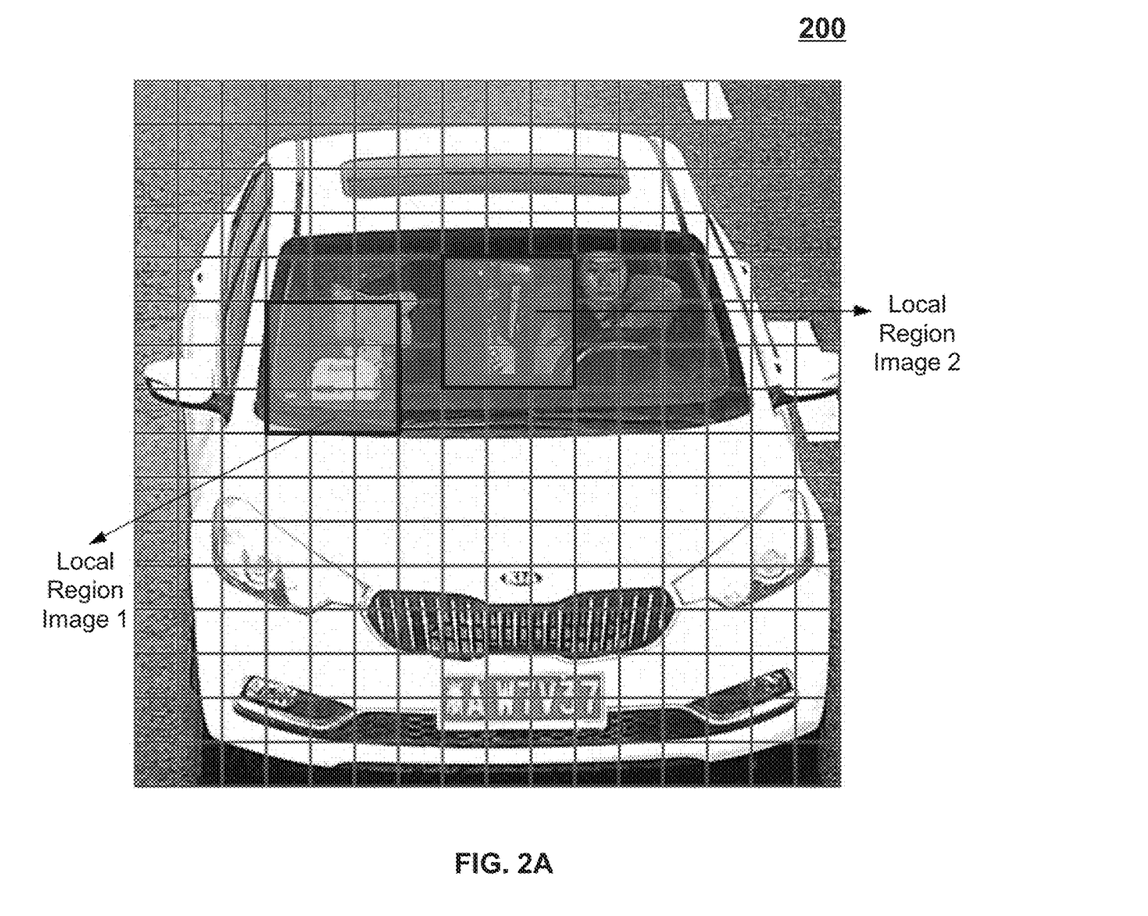
FIG. 2A is a schematic diagram illustrating an exemplary first input and second input in a model training according to some embodiments of the present disclosure.
Figure 2B:
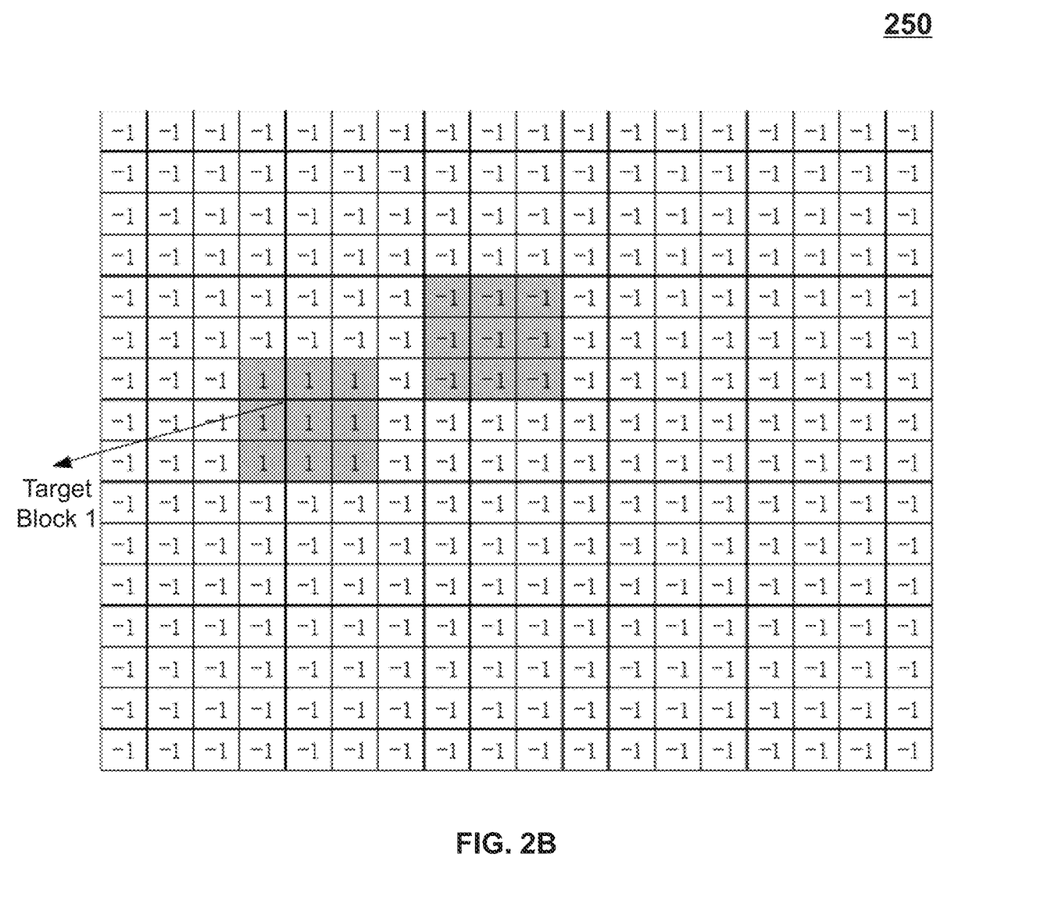
FIG. 2B is a schematic diagram illustrating a first exemplary score map according to some embodiments of the present disclosure.
Figure 2C:
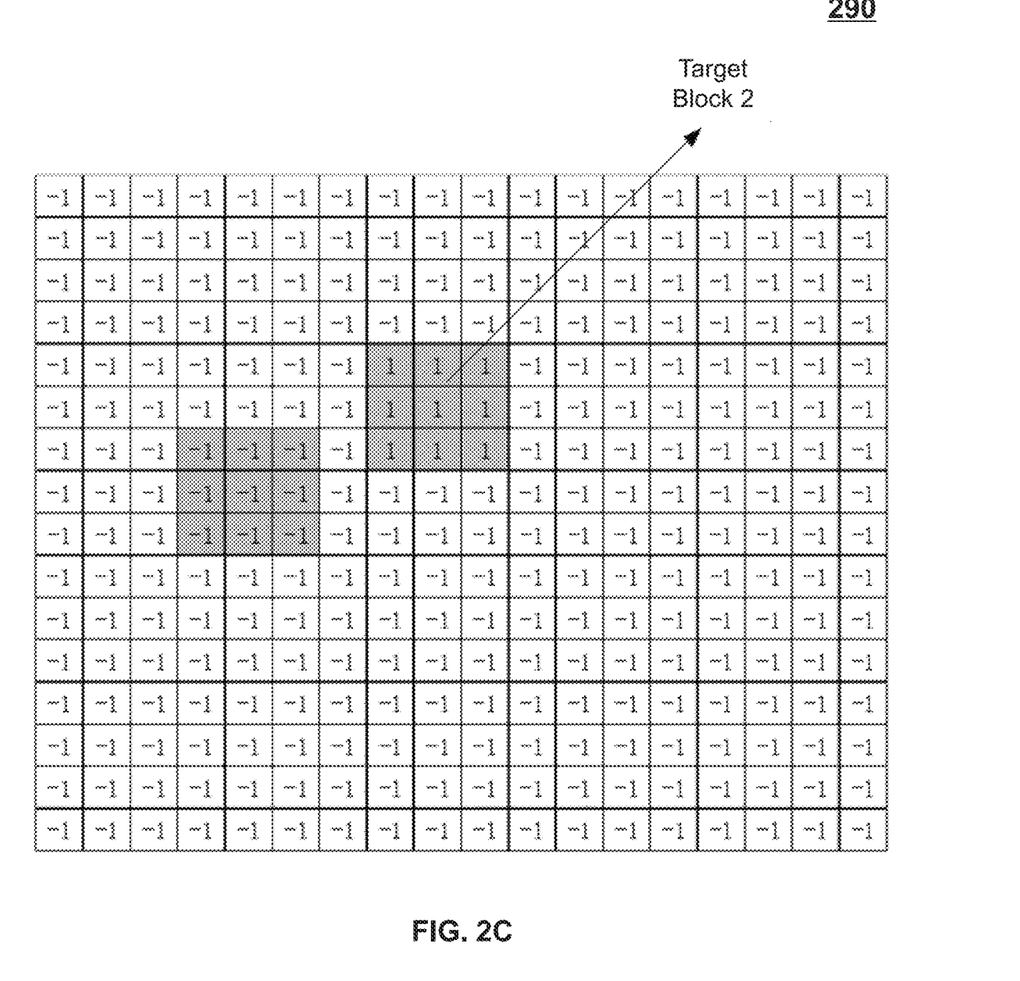
FIG. 2C is a schematic diagram illustrating a second exemplary score map according to some embodiments of the present disclosure.

For example, referring to FIG. 2A, the training module 45 may use the image 200 as the second input image and use the local region image 1 (i.e., the region image of the tissue box) as the first input image. Referring to FIG. 2B, the training module 45 may output the final score map 250. Assuming that the scores in the score map 250 are expected scores, the scores of points in the target block 1 may be marked as +1, and the scores of other points may be marked as −1. As another example, also referring to FIG. 2A, the training module 45 may use the image 200 as the second input image and use the local region image 2 (i.e., the region image of the pendant) as the first input image. Referring to FIG. 2C, the training module 45 may output the final score map 290. Assuming that the scores in the score map 290 are expected scores, the scores of points in the target block 2 may be marked as +1, and the scores of other points may be marked as −1.

Further, after determining the loss value corresponding to each point in the score map, the training module 45 may determine the average loss value of the loss values of points in the score map. The average loss value may serve as the loss value of the score map. In some embodiments, the loss value of the score map may be performed according to Equation 3.

$$L(y, v) = \frac{1}{D}\sum_{u \in D} l(y[u], v[u]), \quad \text{Equation 3}$$

wherein, D refers to the number of scores in a score map, i.e., the number of points in the score map; y[u] and v[u] refer to the values of y and v corresponding to each point in the score map respectively.

Further, the training module 45 may determine whether the loss value of the score map falls within a set range.

Upon the determination that the loss value of the score map falls within the set range, the training module 45 may determine that the training process of the fully convolutional siamese neural network model is completed.

Upon the determination that the loss value of the score map exceeds the set range, the training module 45 may adjust the configuration parameters. The adjusted configuration parameters may be used to acquire the image features and generate the score map in a next iteration.

Specifically, in the model training process, in order to minimize the loss value of the score map, i.e., to minimize the error between an output score of the full convolutional neural network and a manually labeled score, the training module 45 may adjust the configuration parameters needed in the fully convolutional siamese and set a narrower set range. In some embodiments, the training module 45 may adjust the configuration parameters according to neural network gradient back propagation algorithms. In some embodiments, in order to facilitate the convergence in the training process, one or more training algorithms relating to neural network may be used as auxiliary strategies. The one or more training algorithms may include but not limited to softmax loss, center loss, and triplet loss.

Figure 3:
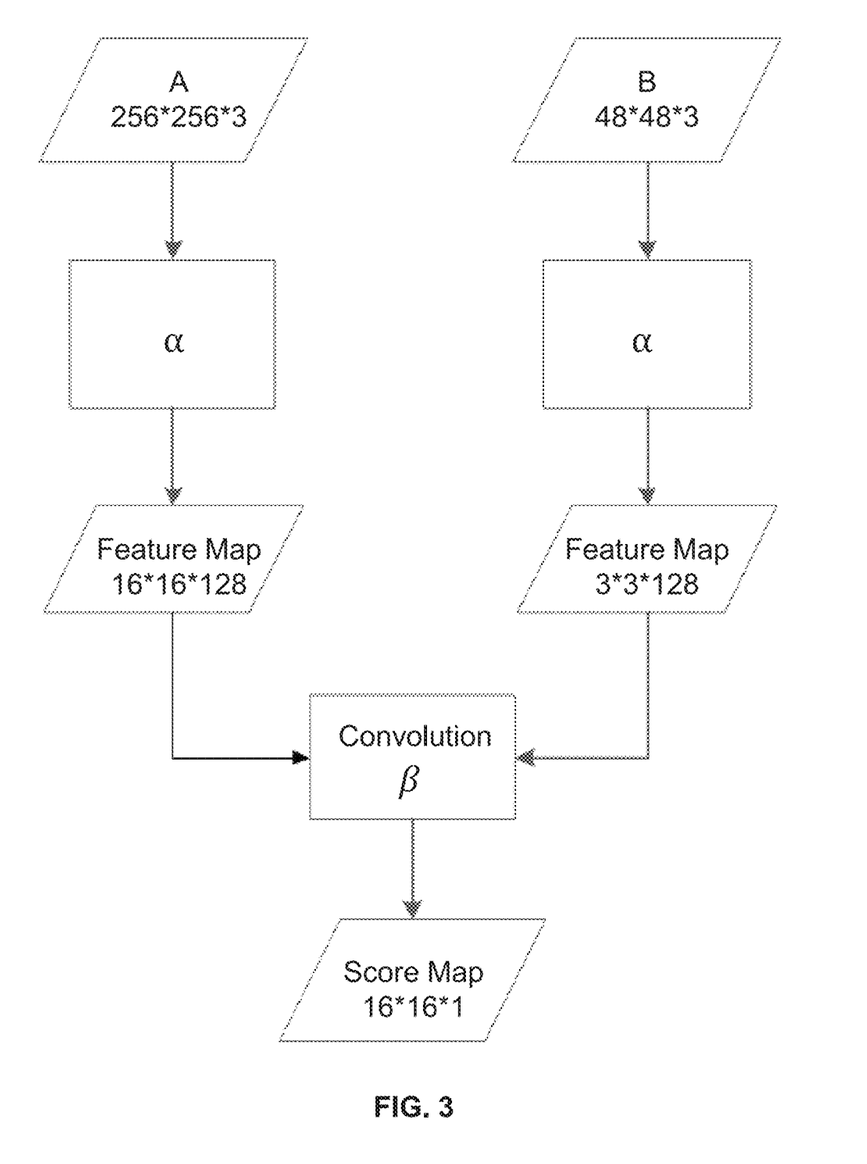
FIG. 3 is a flowchart illustrating an exemplary process of reverse image search for an image of car according to some embodiments of the present disclosure.

In the following, to further describe the reverse image search, an exemplary process of the reverse image search for an image of car captured at the bayonet may be illustrated according to some embodiments of the present disclosure.

Assume that the sizes of pre-stored images of car captured at the bayonet have been normalized to 256*256, the user has uploaded an image of car with a size of 256*256, and the user has selected a 48*48 local region image from the uploaded image as the search condition for reverse image search. Referring to FIG. 3, the extraction module 41 may use the pre-stored 256*256 image and the 48*48 local region image as the input image A (e.g., the second input image) and the input image B (e.g., the first input image) of the fully convolutional siamese neural network model, respectively. The input image A and the input image B may include three-color channels respectively. It should be understood, the input image A may refer to the second image (also referred to as the target image), and the input image B may refer to the local region image of the first image (also referred to as the reference image).

Further, the extraction module 41 may extract the image features of the input image A and the input image B (i.e., the process a shown in FIG. 3, including at least one convolution process and at least one pooling process). The image features of the input image A and the input image B may be extracted respectively on two network branches of the fully convolutional siamese neural network. For example, for the image in each color channel of the input image A and the input image B, the extraction module 41 may perform convolution processing using 16 convolution kernels of 3*3 and using 1 pixel as the convolution stride in convolution layer 1, thus outputting 16 feature maps of 256*256 and 16 feature maps of 48*48 respectively. For each feature map, the extraction module 41 may perform pooling processing using 32 convolution kernels of 2*2 and using 2 pixels as the pooling stride in pooling layer 1, thus outputting 16 feature maps of 128*128 and 16 feature maps of 24*24 respectively. Consequently, using the parameters of the convolution layer 1 and the pooling layer 1 described above, the extraction module 41 may perform convolution processing and pooling processing in convolution layer 2, pooling layer 2, convolution layer 3, pooling layer 3, convolution layer 4 and pooling layer 4 respectively. In the end, the extraction module 41 may output 128 feature maps of 16*16 as the image features corresponding to the input image A and output 128 feature maps of 3*3 as the image features corresponding to the input image B.

Further, the extraction module 41 may perform a convolution calculation to the 128 feature maps of 16*16 corresponding to the input image A and 128 feature maps of 3*3 corresponding to the input image B (i.e., the P process shown in FIG. 3), thus obtaining one score map of 16*16. Each point in the score map may correspond to a 16*16 pixel in the input image A of 256*256. Accordingly, the input image B may correspond to a block including 3*3 points in the score map.

Further, the first determination module 43 may determine a block with the maximum summation of the scores of the 3*3 points in the score map. The block with the maximum summation may be identified as a target block associated with the input image B in the score map.

Further, the second determination module 44 may map the target block to the feature maps corresponding to the input image A. The feature maps corresponding to the input image A, also referred to as the image features of the input image A, may include 128 16*16 feature maps. Thus, after the mapping, the second determination module 44 may obtain 128 3*3 feature maps. Herein the 128 3*3 feature maps may correspond to the target block and serve as the image features of the input image A. In other words, the 128 3*3 feature maps, which serve as the image features of the input image A, may be identified and used to compare with the image features of the input image B (e.g., the feature maps corresponding to the input image B). While the feature maps corresponding to the input image B may include 128 3*3 feature maps, the second determination module 44 may perform the similarity comparison between the 128 3*3 feature maps corresponding to the target block and the 128 3*3 feature maps corresponding to the input image B, thus obtaining the similarity between the input image A and the input image B.

Further, upon the determination that the similarity is greater than the set threshold, the second determination module 44 may mark the input image A as a similar image of the input image B. In some embodiments, the second determination module 44 may determine multiple similar images A of the input image B, and rank the multiple similar images A in a descending order according to the corresponding similarities. The second determination module 44 may display one or more top similar images A as the result of the reverse image search to the user.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional steps may be added elsewhere in the exemplary process 100. For example, before operation 101, the extraction module 41 may enlarge or narrow the first image.

According to the same application concept, the present disclosure further provides a reverse image search device according to some embodiments of the present disclosure. Since the principle of the device is similar to the method of reverse image search illustrated in the present disclosure, the implementation of the device may refer to the implementation of the method, and may not be repeated in the present disclosure.

FIG. 4 is a schematic diagram illustrating an exemplary device 400 of the reverse image search according to some embodiments of the present disclosure. The reverse image search device 400 may include the extraction module 41, the generation module 42, the first determination module 43, and the second determination module 44.

The extraction module 41 may be configured to input the local region image of an obtained first image and a pre-stored second image into a fully convolutional siamese neural network model, and extract image features from the local region image and the second image respectively based on the fully-convolutional siamese neural network model.

The generation module 42 may be configured to generate a score map based on the extracted image features. The score map may include a plurality of points. Each point in the score map may correspond to one or more pixels in the second image. Each pixel may include a specific size. In addition, each point in the score map may correspond to a score.

The first determination module 43 may be configured to identify a target block associated with the local region image according to a summation of the scores of multiple points in the score map.

The second determination module 44 may be configured to determine that the second image is similar to the first image upon a determination that a similarity between the second image features corresponding to the target block and the image features of the local region image is greater than a set threshold.

Further, the first determination module 43 may be configured to: divide the score map into at least one block including a specific number of points; for each of the at least one block, determine the summation of the scores of the specific number of points; and designate the block with the maximum summation of the scores as the target block associated with the local region image. In some embodiments, for each of the at least one block, after determining the summation of the scores of the specific number of points, the first determination module 43 may be configured to determine whether the maximum summation of the scores is greater than a set threshold. Upon the determination that the maximum summation of the scores is greater than the set threshold, the first determination module 43 may determine the block with the maximum summation as the target block.

Further, the extraction module 41 may be configured to execute at least one convolution processing and at least one pooling processing on the local region image, and obtain the image features of the local region image based on the fully convolutional siamese neural network model. The extraction module 41 may also be configured to execute at least one convolution processing and at least one pooling processing on the second image and obtain the second image features of the second image.

Further, generating the score map based on the extracted image features may include performing a convolution calculation to the image features of the local region image and the second image feature of the second image. The result of the convolution calculation may serve as the score map.

Further, the reverse image search device 400 may include the training module 45. The training module 45 may be configured to train the fully convolutional siamese neural network model before inputting the local region image of an obtained first image and a pre-stored second image into the fully convolutional siamese neural network model. The training module 45 may obtain a plurality of sample images relating to the same object as the training sample set. For each sample image, the training module 45 may obtain a local region image of the sample image as a first input and obtain the sample image as a second input. The training module 45 may train a preliminary fully convolutional siamese neural network model based on a plurality of first inputs and second inputs. Upon a determination that the score map output by the trained fully convolutional siamese neural network model satisfies a preset condition, the training module 45 may determine that the training process is completed.

Further, the training module 45 may be configured to extract the image features of the first input image and the second input image respectively using the current configuration parameters, and generate a score map based on the extracted image features. Here, the configuration parameters may include parameters needed in the fully convolutional siamese neural network, for example, parameters needed in the convolution processing, the pooling processing, and the generation of the score map.

Further, for each point in the score map, the training module 45 may be configured to determine the loss value between the current score value and the expected score.

Further, the training module 45 may be configured to determine the average loss value of the loss values of points in the score map. The average loss value may serve as the loss value of the score map.

Further, the training module 45 may be configured to determine whether the loss value of the score map falls within a set range.

Upon the determination that the loss value of the score map falls within the set range, the training module 45 may determine that the training process of the fully convolutional siamese neural network model is completed.

Upon the determination that the loss value of the score map exceeds the set range, the training module 45 may adjust the configuration parameters. The adjusted configuration parameters may be used to acquire the image features and generate the score map in a next iteration.

In some embodiments, the first determination module 43 and the second determination module 44 may be further configured to determine whether there is a historical search record relating to the first image. Details regarding to the determination may be found elsewhere in the present disclosure, for example, FIG. 1 and the description thereof.

According to some embodiments of the present disclosure, an electronic device may be provided. The electrical device may include one or more processors and one or more computer readable media. Programs for executing the method of reverse image search may be stored on the one or more computer readable media. When the programs are executed by the one or more processors, one or more operations described in the present disclosure may be implemented.

According to some embodiments of the present disclosure, one or more computer readable media may be provided. Programs for executing the method of reverse image search may be stored in the one or more computer readable media. When the programs are executed by one or more processors, a communication device may perform one or more operations described in the present disclosure.

Further, it will be appreciated by one skilled in the art, aspects of the present disclosure may be illustrated and described herein in any of one or more patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A system for reverse image searching, comprising:
a storage device storing a set of instructions; and
one or more processors in communication with the storage device, wherein when executing the set of instructions, the one or more processors are configured to:
obtain a target part of reference image features of a reference image, wherein the target part of reference image features corresponds to a target region of the reference image;
generate a score map based on the target part of the reference image features and target image features of a target image, wherein the score map includes a plurality of points, each point corresponds to one or more pixels in the target image, and each point corresponding to a score;
determine a target block of the score map based on a plurality of scores, wherein the target block is associated with the target region of the reference image;
obtain a target part of the target image features based on the target block of the score map;
determine, based on the target part of the reference image features and the target part of the target image features, whether the target image is similar to the reference image; and
mark, upon a determination that the target image is similar to the reference image, the target image as a similar image of the reference image.

2. The system of claim 1, wherein to obtain the target part of the reference image features of the reference image, the one or more processors are configured to:
obtain the target region of the reference image; and
obtain the target part of the reference image features corresponding to the target region of the reference image.

3. The system of claim 2, wherein to determine, based on the target part of the reference image features and the target part of the target image features, whether the target image is similar to the reference image, the one or more processors are configured to:
determine a similarity between the target part of the reference image features and the target part of the target image features;
determine whether the similarity is greater than a first threshold; and
upon a determination that the similarity is greater than the first threshold, determine that the target image is similar to the reference image.

4. The system of claim 2, wherein to obtain the target part of the target image features based on the target block of the score map, the one or more processors are configured to:
identify the target region of the target image based on the target block of the score map; and
obtain the target part of the target image features corresponding to the target region of the target image.

5. The system of claim 2, wherein the target part of the reference image features corresponding to the target region of the reference image and the target image features of the target image are obtained based on a fully convolutional siamese neural network model.

6. The system of claim 5, wherein the fully convolutional siamese neural network model is generated based on a training process, the training process including:
obtaining a plurality of sample images, each sample image relating to a same object;
obtaining a preliminary fully convolutional siamese neural network;
for the each sample image,
obtaining a region of the sample image as a first input of the preliminary fully convolutional siamese neural network; and
obtaining the sample image as a second input of the preliminary fully convolutional siamese neural network; and
training the preliminary fully convolutional siamese neural network based on a plurality of first inputs and a plurality of second inputs.

7. The system of claim 6, wherein the training process further includes:
for the each sample image,
generating first sample image features based on the first input;
generating second sample image features based on the second input; and
generating a sample score map based on the first sample image features and the second sample image features; and
training the preliminary fully convolutional siamese neural network based on a plurality of sample score maps.

8. The system of claim 1, wherein to generate the score map based on the target part of the reference image features and the target image features of the target image, the one or more processors are configured to:
conduct a convolution calculation to the target part of the reference image features and the target image features.

9. The system of claim 1, wherein to determine the target block of the score map based on the plurality of scores, the one or more processors are configured to:
obtain one or more blocks of the score map, each block corresponding to the target region of the reference image;
for each of the one or more blocks, determine a summation of the scores corresponding to the points in the block; and
designate the block with a maximum summation of the scores as the target block.

10. The system of claim 9, the one or more processors are further configured to:
determine whether the maximum summation of the scores is greater than a second threshold; and
upon a determination that the maximum summation of the scores is greater than the second threshold, designate the block with the maximum summation of the scores as the target block.

11. The system of claim 1, wherein
a size of the score map is the same as a size of the target image, each point of the score map corresponding to one or more pixels of the target image; and
a size of the target block is the same as a size of the target region of the reference image, each point of the target block corresponding to one or more pixels of the reference image.

12. A method implemented on a reverse image search device having at least one processor, at least one storage medium, and a communication platform connected to a network, the method comprising:
obtaining a target part of reference image features of a reference image, wherein the target part of reference image features corresponds to a target region of the reference image;
generating a score map based on the target part of the reference image features and target image features of a target image, wherein the score map includes a plurality of points, each point corresponds to one or more pixels in the target image, and each point corresponding to a score;
determining a target block of the score map based on a plurality of scores, wherein the target block is associated with the target region of the reference image;
obtaining a target part of the target image features based on the target block of the score map;
determining, based on the target part of the reference image features and the target part of the target image features, whether the target image is similar to the reference image; and
marking, upon a determination that the target image is similar to the reference image, the target image as a similar image of the reference image.

13. The method of claim 12, wherein the obtaining the target part of the reference image features of the reference image includes:
obtaining the target region of the reference image; and
obtaining the target part of the reference image features corresponding to the target region of the reference image.

14. The method of claim 13, wherein the obtaining the target part of the target image features based on the target block of the score map includes:
identifying the target region of the target image based on the target block of the score map; and
obtaining the target part of the target image features corresponding to the target region of the target image.

15. The system of claim 13, wherein the target part of the reference image features corresponding to the target region of the reference image and the target image features of the target image are obtained based on a fully convolutional siamese neural network model.

16. The system of claim 15, wherein the fully convolutional siamese neural network model is generated based on a training process, the training process including:
obtaining a plurality of sample images, each sample image relating to a same object;
obtaining a preliminary fully convolutional siamese neural network;
for the each sample image,
obtaining a region of the sample image as a first input of the preliminary fully siamese neural network; and
obtaining the sample image as a second input of the preliminary siamese fully neural network; and
training the preliminary fully convolutional siamese neural network based on a plurality of first inputs and a plurality of second inputs.

17. The method of claim 12, wherein the generating the score map based on the target part of the reference image features and the target image features of the target image includes:
conducting a convolution calculation to the target part of the reference image features and the target image features.

18. The method of claim 12, wherein the determining the target block of the score map based on the plurality of scores includes:
obtaining one or more blocks of the score map, each block corresponding to the target region of the reference image;
for each of the one or more blocks, determining a summation of the scores corresponding to the points in the block; and
designating the block with a maximum summation of the scores as the target block.

19. The method of claim 12, wherein
a size of the score map is the same as a size of the target image, each point of the score map corresponding to one or more pixels of the target image; and
a size of the target block is the same as a size of the target region of the reference image, each point of the target block corresponding to one or more pixels of the reference image.

20. A non-transitory computer readable medium embodying a computer program product, the computer program product comprising instructions configured to cause a computing system to:
obtain a target part of reference image features of a reference image, wherein the target part of reference image features corresponds to a target region of the reference image;
generate a score map based on the target part of the reference image features and target image features of a target image, wherein the score map includes a plurality of points, each point corresponds to one or more pixels in the target image, and each point corresponding to a score;
determine a target block of the score map based on a plurality of scores, wherein the target block is associated with the target region of the reference image;
obtain a target part of the target image features based on the target block of the score map;
determine, based on the target part of the reference image features and the target part of the target image features, whether the target image is similar to the reference image; and
mark, upon a determination that the target image is similar to the reference image, the target image as a similar image of the reference image.

* * * * *